United States Patent [19]
Otani et al.

[11] Patent Number: 5,885,712
[45] Date of Patent: Mar. 23, 1999

[54] ANTI-REFLECTION FILM AND OPTICAL SYSTEM USING THE SAME

[75] Inventors: Minoru Otani, Tokyo; Kenji Ando, Kawasaki; Yasuyuki Suzuki, Yokohama; Ryuji Biro, Kawasaki; Hidehiro Kanazawa, Tokyo, all of Japan

[73] Assignee: Canon Kabushiki Kaisha, Tokyo, Japan

[21] Appl. No.: 822,469

[22] Filed: Mar. 21, 1997

[30] Foreign Application Priority Data

Mar. 22, 1996 [JP] Japan ................................. 8-093534

[51] Int. Cl.⁶ ................................. B32B 17/06
[52] U.S. Cl. ................ 428/426; 428/688; 428/689; 428/702; 423/625
[58] Field of Search ............................... 428/426, 428, 428/433, 688, 689, 702; 423/592, 600, 624, 625

[56] References Cited

U.S. PATENT DOCUMENTS 4,856,019  8/1989  Miyata et al. .......................... 372/99

FOREIGN PATENT DOCUMENTS 7-218701  8/1995  Japan .
7-244205  9/1995  Japan .
7-244217  9/1995  Japan .

*Primary Examiner*—Elizabeth Evans
*Attorney, Agent, or Firm*—Fitzpatrick, Cella, Harper & Scinto

[57] ABSTRACT

An anti-reflection film is arranged by alternately stacking a plurality of high-refractive index layers containing $Al_2O_3$ and a plurality of low-refractive index layers containing $SiO_2$ on a transparent substrate in turn from the substrate side to the air side, and satisfies:

$1.45 \leq ns \leq 1.65$
$1.60 \leq na \leq 1.85$
$0.31\lambda 0 \leq d1 \leq 0.42\lambda 0$
$0.38\lambda 0 \leq d2 \leq 0.45\lambda 0$
$0.20\lambda 0 \leq d3 \leq 0.31\lambda 0$
$0.18\lambda 0 \leq d4 \leq 0.28\lambda 0$
$0.20\lambda 0 \leq d5 \leq 0.30\lambda 0$
$0.20\lambda 0 \leq d6 \leq 0.30\lambda 0$ where ns and na are the refractive indices of the low-refractive index layer and the high-refractive index layer for light components falling with the wavelength range from 190 nm to 250 nm, di (unit: nm) is the optical film thickness of the i-th layer when the high- and low-refractive index layers are counted from the substrate side to the air side, and $\lambda 0$ (nm) is the reference wavelength within the wavelength range from 190 nm to 250 nm.

15 Claims, 13 Drawing Sheets

ANTI-REFLECTION FILM AND OPTICAL SYSTEM USING THE SAME

BACKGROUND OF THE INVENTION

1. Field of the Invention

The present invention relates to an anti-reflection film and an optical system using the same and, more particularly, to an anti-reflection film, which attains anti-reflection characteristics for the ultraviolet range having a wavelength of 250 nm or less by stacking a plurality of predetermined refractive index layers on the surface of an optical element substrate such as a fluorite substrate, synthetic silica glass substrate, or the like, and is effectively applied to, e.g., various types of optical systems used in the manufacture of semiconductor devices.

2. Related Background Art

As a conventional anti-reflection film for ultraviolet rays, an anti-reflection film formed by alternately stacking a plurality of high-refractive index films including an $Al_2O_3$ film and a plurality of low-refractive index films including an $SiO_2$ film on the surface of a transparent substrate has been proposed by, e.g., Japanese Laid-Open Patent Application No. 7-218701.

Also, an anti-reflection film using a fluoride film has been proposed by, e.g., Japanese Laid-Open Patent Application Nos. 7-244205 and 7-244217.

The anti-reflection film using the $Al_2O_3$ and $SiO_2$ films and proposed by Japanese Laid-Open Patent Application No. 7-218701 as the anti-reflection film for ultraviolet rays having a wavelength of 250 nm or less tends to have a relatively narrow anti-reflection bandwidth (wavelength width).

In general, when the anti-reflection bandwidth is narrow, the obtained wavelength width may often vary due to errors in film thickness control during fabrication. When the anti-reflection film is formed on the curved surface of, e.g., a lens, the optical characteristics such as reflectivity, transmittance, and the like often vary considerably depending on different angles of incidence of light.

The anti-reflection film using the fluoride film and proposed by Japanese Laid-Open Patent Application Nos. 7-244205 and 7-244217 can hardly attain reflectivity as low as 0.2% or less in the assumed wavelength range, and the environmental resistance of the fluoride film is inferior to that of oxides ($Al_2O_3$, $SiO_2$).

SUMMARY OF THE INVENTION

It is an object of the present invention to provide an anti-reflection film which can realize high anti-reflection characteristics in a broad range within the ultraviolet range having a wavelength of 250 nm or less and has high environmental resistance by stacking high- and low-refractive index films with appropriate optical film thicknesses on a transparent substrate having a predetermined refractive index, and an optical system using the same.

In order to achieve the above object, according to an aspect of the present invention, there is provided an anti-reflection film arranged by alternately stacking a plurality of high-refractive index layers containing $Al_2O_3$ and a plurality of low-refractive index layers containing $SiO_2$ on a transparent substrate in turn from the substrate side to an air side, and satisfying:

$1.45 \leq ns \leq 1.65$
$1.60 \leq na \leq 1.85$
$0.31\lambda 0 \leq d1 \leq 0.42\lambda 0$
$0.38\lambda 0 \leq d2 \leq 0.45\lambda 0$
$0.20\lambda 0 \leq d3 \leq 0.31\lambda 0$
$0.18\lambda 0 \leq d4 \leq 0.28\lambda 0$
$0.20\lambda 0 \leq d5 \leq 0.30\lambda 0$
$0.20\lambda 0 \leq d6 \leq 0.30\lambda 0$ where ns and na are the refractive indices of the low-refractive index layer and the high-refractive index layer for light components falling with a wavelength range from 190 nm to 250 nm, di (unit: nm) is the optical film thickness of the i-th layer when the high- and low-refractive index layers are counted from the substrate side to the air side, and λ0 (nm) is the reference wavelength within the wavelength range from 190 nm to 250 nm.

The substrate comprises fluorite or silica glass.

The anti-reflection film is formed by sputtering.

The anti-reflection film is formed by vacuum deposition.

According to an aspect of the present invention, there is provided an optical system comprising:

a lens, which is coated with an anti-reflection film arranged by alternately stacking a plurality of high-refractive index layers containing $Al_2O_3$ and a plurality of low-refractive index layers containing $SiO_2$ on a transparent substrate in turn from the substrate side to an air side, and satisfying:

$1.45 \leq ns \leq 1.65$
$1.60 \leq na \leq 1.85$
$0.31\lambda 0 \leq d1 \leq 0.42\lambda 0$
$0.38\lambda 0 \leq d2 \leq 0.45\lambda 0$
$0.20\lambda 0 \leq d3 \leq 0.31\lambda 0$
$0.18\lambda 0 \leq d4 \leq 0.28\lambda 0$
$0.20\lambda 0 \leq d5 \leq 0.30\lambda 0$
$0.20\lambda 0 \leq d6 \leq 0.30\lambda 0$ where ns and na are the refractive indices of the low-refractive index layer and the high-refractive index layer for light components falling with a wavelength range from 190 nm to 250 nm, di (unit: nm) is the optical film thickness of the i-th layer when the high- and low-refractive index layers are counted from the substrate side to the air side, and λ0 (nm) is the reference wavelength within the wavelength range from 190 nm to 250 nm.

According to another aspect of the present invention, there is provided an anti-reflection film arranged by alternately stacking a plurality of high-refractive index layers containing $Al_2O_3$ and a plurality of low-refractive index layers containing $SiO_2$ on a transparent substrate in turn from the substrate side to an air side, and satisfying:

$1.45 \leq ns \leq 1.65$
$1.60 \leq na \leq 1.85$
$0.06\lambda 0 \leq d1 \leq 0.17\lambda 0$
$0.48\lambda 0 \leq d2 \leq 0.59\lambda 0$
$0.25\lambda 0 \leq d3 \leq 0.35\lambda 0$
$0.18\lambda 0 \leq d4 \leq 0.28\lambda 0$
$0.20\lambda 0 \leq d5 \leq 0.30\lambda 0$
$0.20\lambda 0 \leq d6 \leq 0.30\lambda 0$ where ns and na are the refractive indices of the low-refractive index layer and the high-refractive index layer for light components falling with a wavelength range from 190 nm to 250 nm, di (unit: nm) is the optical film thickness of the i-th layer when the high- and low-refractive index layers are counted from the substrate side to the air side, and λ0 (nm) is the reference wavelength within the wavelength range from 190 nm to 250 nm.

The substrate comprises fluorite.

The anti-reflection film is formed by sputtering.

The anti-reflection film is formed by vacuum deposition.

According to another aspect of the present invention, there is provided an optical system comprising:

a lens, which is coated with an anti-reflection film arranged by alternately stacking a plurality of high-refractive index layers containing $Al_2O_3$ and a plurality of low-refractive index layers containing $SiO_2$ on a transparent substrate in turn from the substrate side to an air side, and satisfying:

$1.45 \leq ns \leq 1.65$
$1.60 \leq na \leq 1.85$
$0.06\lambda 0 \leq d1 \leq 0.17\lambda 0$
$0.48\lambda 0 \leq d2 \leq 0.59\lambda 0$
$0.25\lambda 0 \leq d3 \leq 0.35\lambda 0$
$0.18\lambda 0 \leq d4 \leq 0.28\lambda 0$
$0.20\lambda 0 \leq d5 \leq 0.30\lambda 0$
$0.20\lambda 0 \leq d6 \leq 0.30\lambda 0$ where ns and na are the refractive indices of the low-refractive index layer and the high-refractive index layer for light components falling with a wavelength range from 190 nm to 250 nm, di (unit: nm) is the optical film thickness of the i-th layer when the high- and low-refractive index layers are counted from the substrate side to the air side, and $\lambda 0$ (nm) is the reference wavelength within the wavelength range from 190 nm to 250 nm.

According to still another aspect of the present invention, there is provided an anti-reflection film arranged by alternately stacking a plurality of high-refractive index layers containing $Al_2O_3$ and a plurality of low-refractive index layers containing $SiO_2$ on a transparent substrate in turn from the substrate side to an air side, and satisfying:

$1.45 \leq ns \leq 1.65$
$1.60 \leq na \leq 1.85$
$0.01\lambda 0 \leq d1 \leq 0.11\lambda 0$
$0.57\lambda 0 \leq d2 \leq 0.67\lambda 0$
$0.20\lambda 0 \leq d3 \leq 0.31\lambda 0$
$0.45\lambda 0 \leq d4 \leq 0.56\lambda 0$
$0.15\lambda 0 \leq d5 \leq 0.26\lambda 0$
$0.21\lambda 0 \leq d6 \leq 0.32\lambda 0$
$0.20\lambda 0 \leq d7 \leq 0.30\lambda 0$
$0.20\lambda 0 \leq d8 \leq 0.30\lambda 0$ where ns and na are the refractive indices of the low-refractive index layer and the high-refractive index layer for light components falling with a wavelength range from 190 nm to 250 nm, di (unit: nm) is the optical film thickness of the i-th layer when the high- and low-refractive index layers are counted from the substrate side to the air side, and $\lambda 0$ (nm) is the reference wavelength within the wavelength range from 190 nm to 250 nm.

The substrate comprises fluorite.

The anti-reflection film is formed by sputtering.

The anti-reflection film is formed by vacuum deposition.

According to still another aspect of the present invention, there is provided an optical system comprising:

a lens, which is coated with an anti-reflection film arranged by alternately stacking a plurality of high-refractive index layers containing $Al_2O_3$ and a plurality of low-refractive index layers containing $SiO_2$ on a transparent substrate in turn from the substrate side to an air side, and satisfying:

$1.45 \leq ns \leq 1.65$
$1.60 \leq na \leq 1.85$
$0.01\lambda 0 \leq d1 \leq 0.11\lambda 0$
$0.57\lambda 0 \leq d2 \leq 0.67\lambda 0$
$0.20\lambda 0 \leq d3 \leq 0.31\lambda 0$
$0.45\lambda 0 \leq d4 \leq 0.56\lambda 0$
$0.15\lambda 0 \leq d5 \leq 0.26\lambda 0$
$0.21\lambda 0 \leq d6 \leq 0.32\lambda 0$
$0.20\lambda 0 \leq d7 \leq 0.30\lambda 0$
$0.20\lambda 0 \leq d8 \leq 0.30\lambda 0$ where ns and na are the refractive indices of the low-refractive index layer and the high-refractive index layer for light components falling with a wavelength range from 190 nm to 250 nm, di (unit: nm) is the optical film thickness of the i-th layer when the high- and low-refractive index layers are counted from the substrate side to the air side, and $\lambda 0$ (nm) is the reference wavelength within the wavelength range from 190 nm to 250 nm.

The detailed embodiments of the present invention will become apparent from some embodiments to be described hereinafter.

DETAILED DESCRIPTION OF THE PREFERRED EMBODIMENTS

Figure 1:
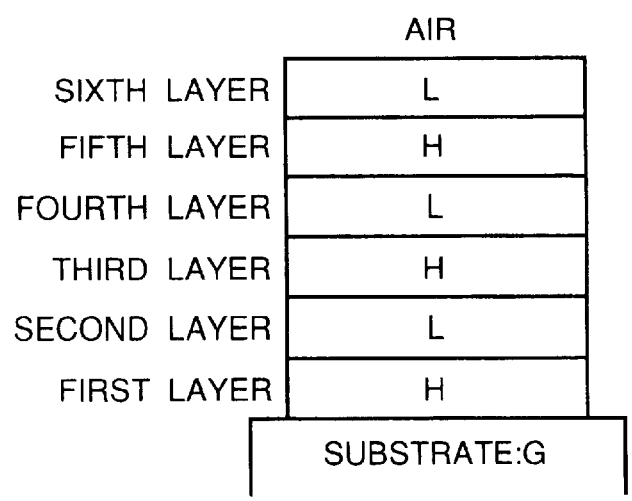
FIG. 1 is a sectional view showing principal part of an anti-reflection film according to the present invention.

FIG. 1 is a sectional view showing principal part of an anti-reflection film according to an embodiment of the present invention. The anti-reflection film of this embodiment comprises a multi-layered film prepared by alternately stacking high-refractive index layers containing $Al_2O_3$ and low-refractive index layers containing $SiO_2$ on the surface of a transparent substrate G to obtain a six- or eight-layered structure as a whole (FIG. 1 illustrates the six-layered structure). The substrate G comprises fluorite having a refractive index lower than that of each low-refractive index layer, synthetic silica ($SiO_2$) having a refractive index slightly higher than that of the low-refractive index layer, or the like.

When the six layers of the anti-reflection film shown in FIG. 1 are counted in turn from the substrate G side to the air layer side, the first, third, and fifth layers (the first, third, fifth, and seventh layers in the eight-layered structure) are high-refractive index layers (H) containing $Al_2O_3$, and the second, fourth, and sixth layers (the second, fourth, sixth, and eighth layers in the eight-layered structure) are low-refractive index layers (L) containing $SiO_2$. When na, ns, and n respectively represent the refractive indices of the high- and low-refractive index layers H and L, and the substrate G with respect to light components falling within the wavelength range from 190 nm to 250 nm when the substrate G comprises a fluorite substrate, the anti-reflection film satisfies:

$1.45 \leq ns \leq 1.65$ $1.60 \leq na \leq 1.85$ $n \leq ns$

When a synthetic silica glass substrate having a refractive index equal to or slightly higher than that of the low-refractive index layer is used as the substrate G, the anti-reflection film satisfies:

$1.45 \leq ns \leq 1.65$ $1.60 \leq na \leq 1.85$

In this way, this embodiment can obtain broadband anti-reflection characteristics in the ultraviolet range, and can provide an anti-reflection film with high environmental resistance in the vacuum ultraviolet wavelength range by combining only oxides.

Note that the refractive indices of $Al_2O_3$, $SiO_2$, synthetic silica, and fluorite at the wavelengths of 193 nm and 248 nm are as follows:

|  | 193 nm | 248 nm |
|---|---|---|
| $Al_2O_3$ | 1.77 | 1.73 |
| $SiO_2$ | 1.54 | 1.51 |
| Synthetic silica | 1.56 | 1.52 |
| Fluorite | 1.50 | 1.49 |

In this embodiment, the synthetic silica glass or fluorite substrate is used as the substrate G, and the high- and low-refractive index films are alternately stacked on the substrate to obtain a multi-layered structure. In this case, for example, when six layers are stacked, the anti-reflection film satisfies:

$0.31\lambda_0 \leq d1 \leq 0.42\lambda_0$ $0.38\lambda_0 \leq d2 \leq 0.45\lambda_0$ $0.20\lambda_0 \leq d3 \leq 0.31\lambda_0$ $0.18\lambda_0 \leq d4 \leq 0.28\lambda_0$ $0.20\lambda_0 \leq d5 \leq 0.30\lambda_0$ $0.20\lambda_0 \leq d6 \leq 0.30\lambda_0$ or $0.06\lambda_0 \leq d1 \leq 0.17\lambda_0$ $0.48\lambda_0 \leq d2 \leq 0.59\lambda_0$ $0.25\lambda_0 \leq d3 \leq 0.35\lambda_0$ $0.18\lambda_0 \leq d4 \leq 0.28\lambda_0$ $0.20\lambda_0 \leq d5 \leq 0.30\lambda_0$ $0.20\lambda_0 \leq d6 \leq 0.30\lambda_0$ where di (unit: nm) is the optical film thickness of the i-th layer when the high- and low-refractive index layers are counted in turn from the substrate side to the air side, and $\lambda_0$ (nm) is the reference wavelength within the wavelength range from 190 nm to 250 nm.

Also, when high- and low-refractive index layers are alternately stacked to obtain an eight-layered structure as a whole, the anti-reflection film satisfies:

$0.01\lambda_0 \leq d1 \leq 0.11\lambda_0$ $0.57\lambda_0 \leq d2 \leq 0.67\lambda_0$ $0.20\lambda_0 \leq d3 \leq 0.31\lambda_0$ $0.45\lambda_0 \leq d4 \leq 0.56\lambda_0$ $0.15\lambda_0 \leq d5 \leq 0.26\lambda_0$ $0.21\lambda_0 \leq d6 \leq 0.32\lambda_0$ $0.20\lambda_0 \leq d7 \leq 0.30\lambda_0$ $0.20\lambda_0 \leq d8 \leq 0.30\lambda_0$ where di (unit: nm) is the optical film thickness of the i-th layer when the high- and low-refractive index layers are counted in turn from the substrate side to the air side, and $\lambda_0$ (nm) is the reference wavelength within the wavelength range from 190 nm to 250 nm. Note that the reference wavelength $\lambda_0$ is an arbitrary wavelength within the wavelength range from 190 nm to 250 nm. Also, the optical film thickness d (nm) is described by:

$d = n \times D$ where n is the refractive index of the substance in question and D (unit: nm) is the geometric thickness.

This embodiment can obtain a satisfactory anti-reflection film which has high environmental resistance and a broad anti-reflection bandwidth in the ultraviolet range, as will be described later, by alternately stacking high-refractive index layers containing $Al_2O_3$ and low-refractive index layers containing $SiO_2$ while appropriately setting their optical film thicknesses (refractive index of material×geometric thickness).

Numerical value examples of the anti-reflection film of the present invention will be described below.

Embodiment 1

Figure 2:
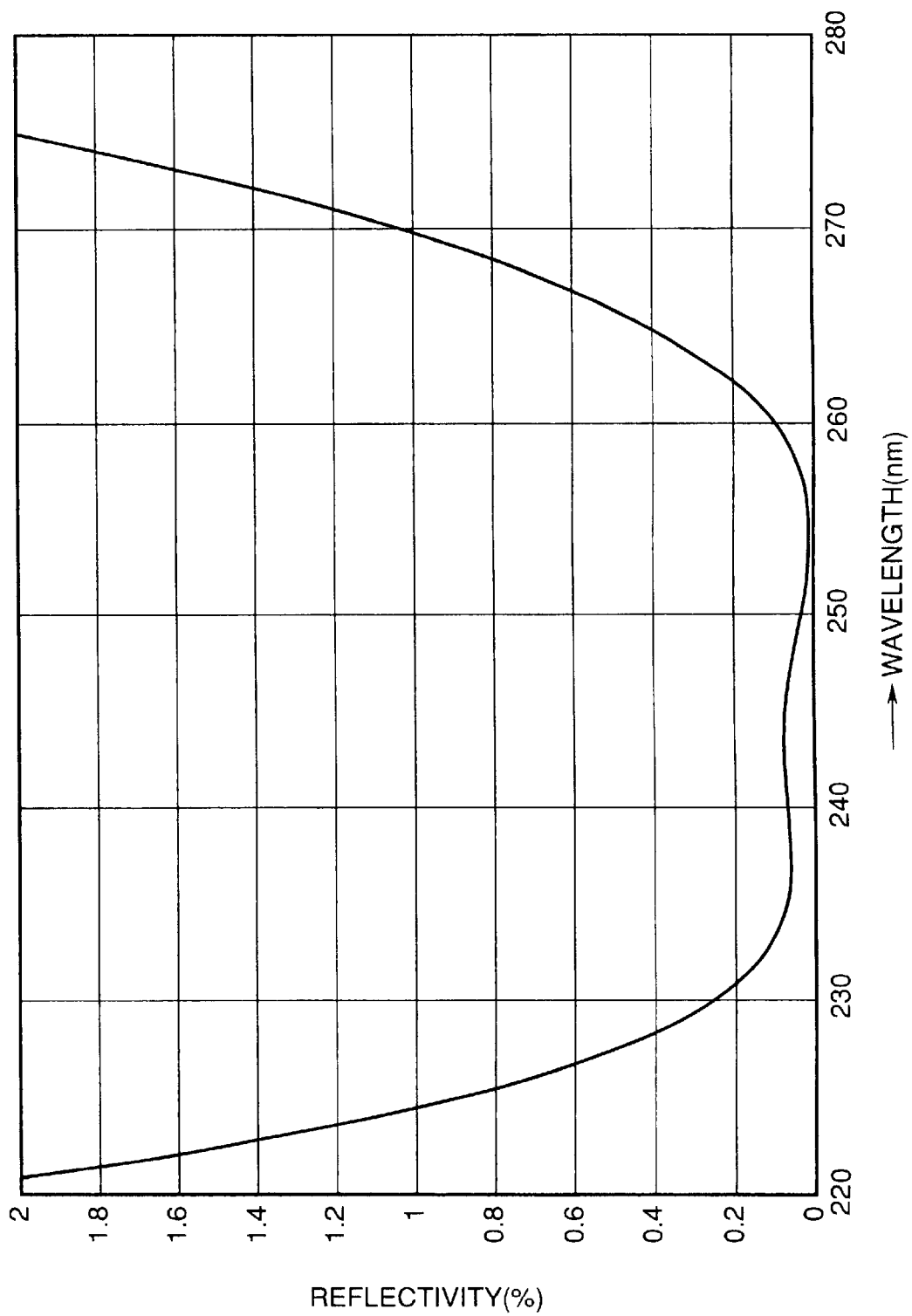
FIG. 2 is a graph showing the reflectivity characteristics of a six-layered anti-reflection film according to the present invention, which is formed on a synthetic silica glass substrate and has a designed central wavelength of 248 nm.

Table 1 below summarizes the arrangement of the anti-reflection film for ultraviolet rays, which has a designed central wavelength (reference wavelength) $\lambda_0$=248 nm. The anti-reflection film was fabricated using vacuum deposition by stacking layers on a synthetic silica glass substrate to have film thicknesses shown in Table 1 below, and its reflection characteristics were measured. FIG. 2 shows the measurement results of the reflectivity optical characteristics. The wavelength bandwidth corresponding to a reflectivity of 0.2% or less was as broad as 30 nm.

TABLE 1

| Material | Optical Film Thickness (unit: nm) |
|---|---|
| Incidence Medium | Air | — |
| Sixth Layer | SiO$_2$ | 0.25λ0 |
| Fifth Layer | Al$_2$O$_3$ | 0.24λ0 |
| Fourth Layer | SiO$_2$ | 0.24λ0 |
| Third Layer | Al$_2$O$_3$ | 0.25λ0 |
| Second Layer | SiO$_2$ | 0.41λ0 |
| First Layer | Al$_2$O$_3$ | 0.36λ0 |
| Outgoing Medium | Synthetic silica | — |

Embodiment 2

Figure 3:
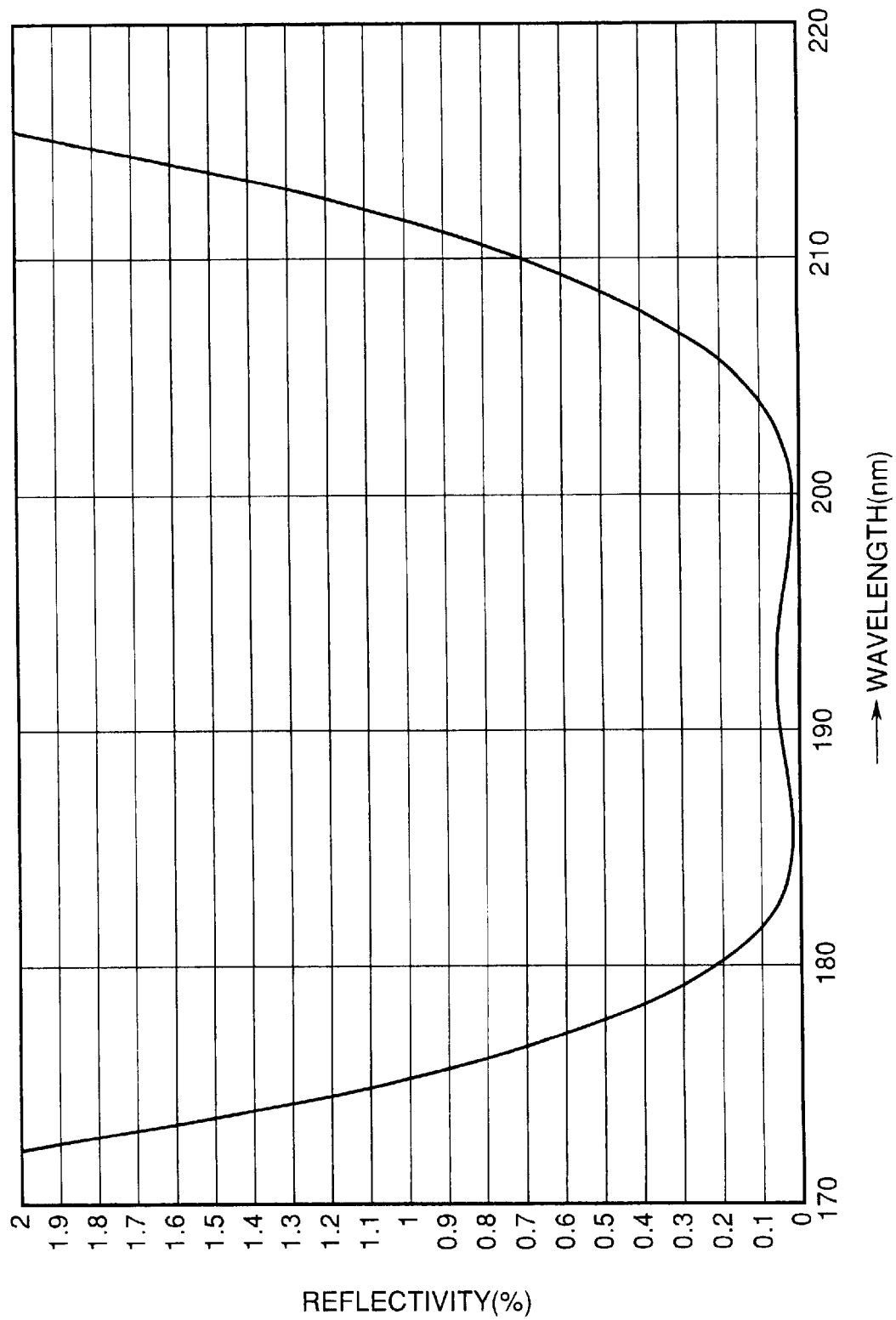
FIG. 3 is a graph showing the reflectivity characteristics of a six-layered anti-reflection film according to the present invention, which is formed on a synthetic silica glass substrate and has a designed central wavelength ($\lambda 0$) of 193 nm.

Table 2 below summarizes the arrangement of the anti-reflection film for ultraviolet rays, which has a designed central wavelength (reference wavelength) λ0=193 nm. The anti-reflection film was fabricated using vacuum deposition by stacking layers on a synthetic silica glass substrate to have film thicknesses shown in Table 2 below, and its reflection characteristics were measured. FIG. 3 shows the measurement results of the reflectivity optical characteristics. A film arrangement having a wavelength bandwidth corresponding to a reflectivity of 0.2% or less as broad as 26 nm even in the vacuum ultraviolet wavelength range having a wavelength of 200 nm or less could be realized.

TABLE 2

| Material | Optical Film Thickness (unit: nm) |
|---|---|
| Incidence Medium | Air | — |
| Sixth Layer | SiO$_2$ | 0.25λ0 |
| Fifth Layer | Al$_2$O$_3$ | 0.25λ0 |
| Fourth Layer | SiO$_2$ | 0.23λ0 |
| Third Layer | Al$_2$O$_3$ | 0.26λ0 |
| Second Layer | SiO$_2$ | 0.43λ0 |
| First Layer | Al$_2$O$_3$ | 0.37λ0 |
| Outgoing Medium | Synthetic silica | — |

Embodiment 3

Figure 4:
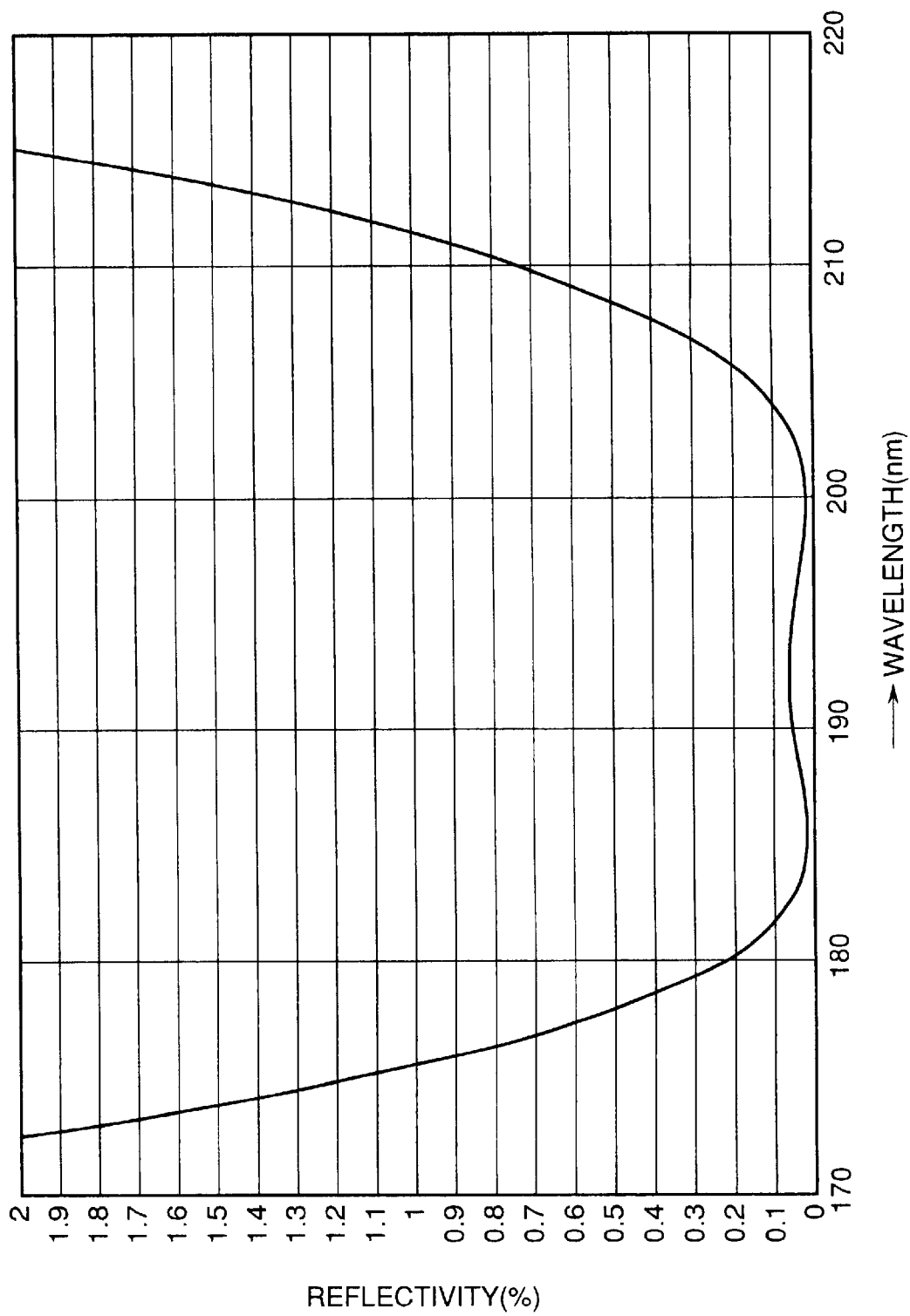
FIG. 4 is a graph showing the reflectivity characteristics of a six-layered anti-reflection film according to the present invention, which is formed on a fluorite substrate and has a designed central wavelength ($\lambda 0$) of 193 nm.

Table 3 below summarizes the arrangement of the anti-reflection film for ultraviolet rays, which has a designed central wavelength (reference wavelength) λ0=193 nm. The anti-reflection film was fabricated using vacuum deposition by stacking layers on a fluorite substrate to have film thicknesses shown in Table 3 below, and its reflection characteristics were measured. FIG. 4 shows the measurement results of the reflectivity optical characteristics. The wavelength bandwidth corresponding to a reflectivity of 0.2% or less was as broad as 26 nm.

TABLE 3

| Material | Optical Film Thickness (unit: nm) |
|---|---|
| Incidence Medium | Air | — |
| Sixth Layer | SiO$_2$ | 0.25λ0 |
| Fifth Layer | Al$_2$O$_3$ | 0.25λ0 |
| Fourth Layer | SiO$_2$ | 0.24λ0 |
| Third Layer | Al$_2$O$_3$ | 0.25λ0 |
| Second Layer | SiO$_2$ | 0.42λ0 |

TABLE 3-continued

| Material | Optical Film Thickness (unit: nm) |
|---|---|
| First Layer | Al$_2$O$_3$ | 0.37λ0 |
| Outgoing Medium | Fluorite (synthetic silica) | — |

Figure 5:
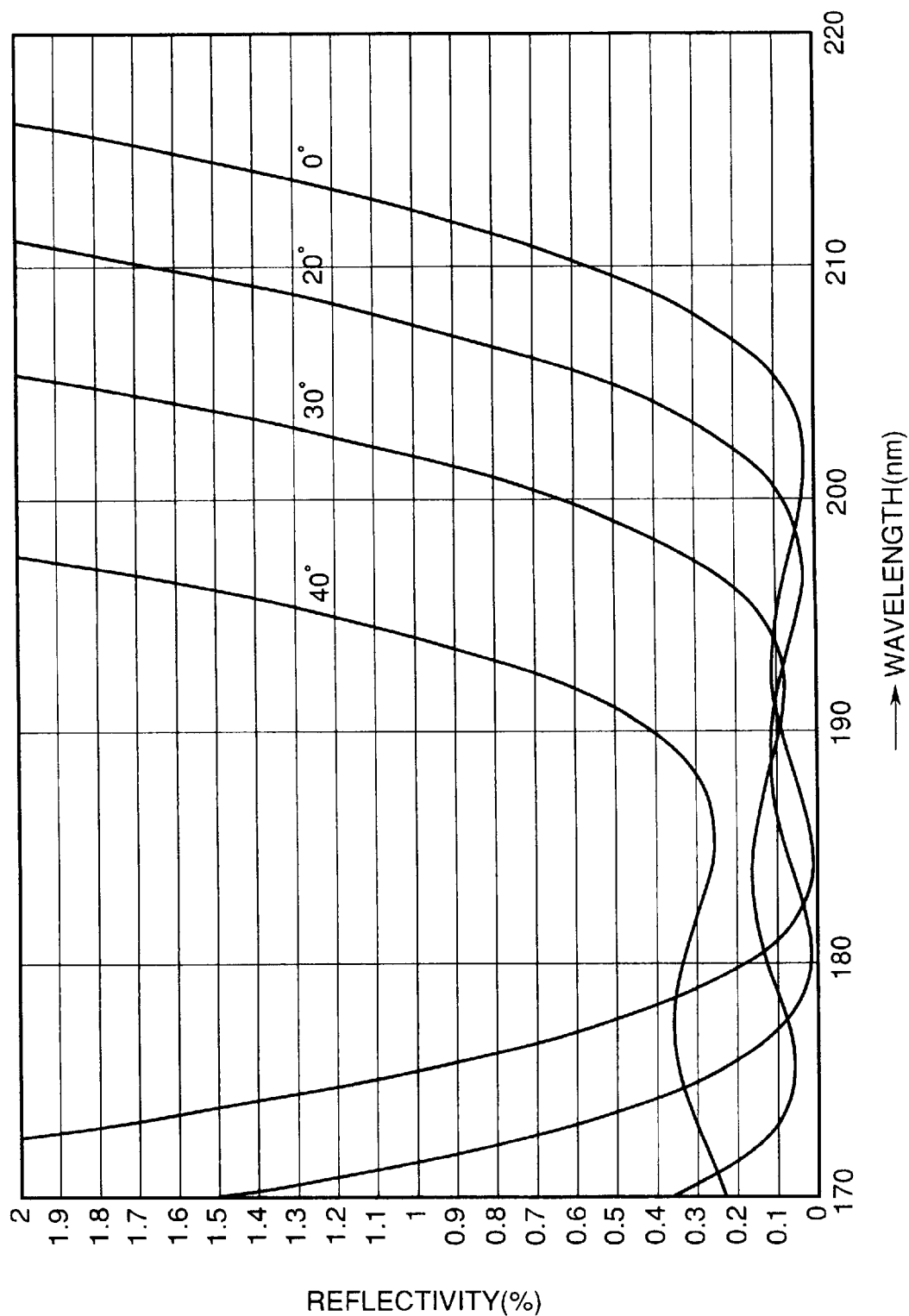
FIG. 5 is a graph showing the measurement results of dependence of the reflectivity characteristics on the angle of incidence of a six-layered anti-reflection film according to the present invention, which is formed on a fluorite substrate and has a designed central wavelength ($\lambda 0$) of 193 nm.

FIG. 5 shows the measurement results obtained by changing the angle of incidence of light to this anti-reflection film from 0° to 40°. The reflectivity remained 0.2% or less even when the angle of incidence was changed from 0° to 30° at the designed central wavelength (λ0) of 193 nm.

Embodiment 4

Figure 6:
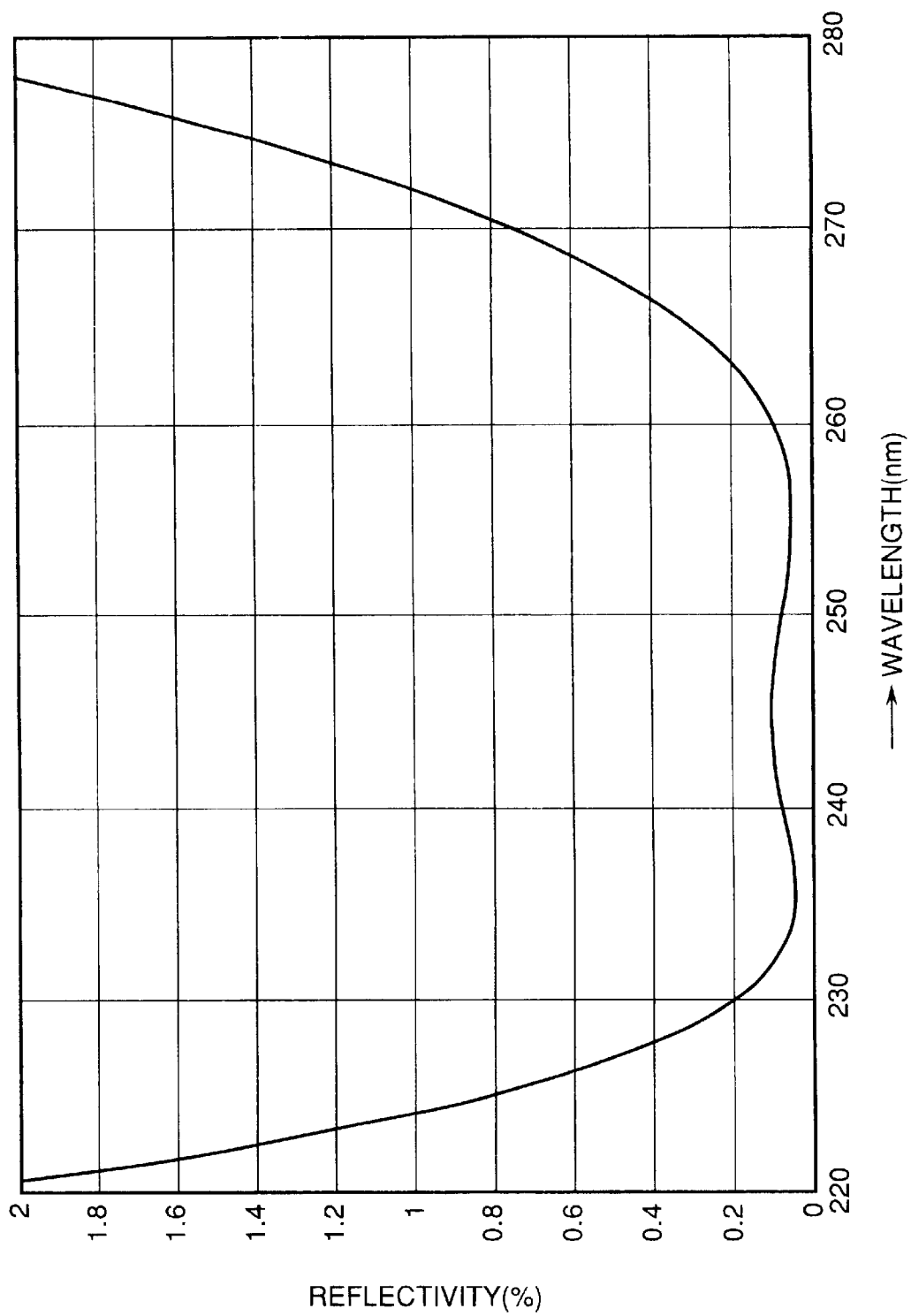
FIG. 6 is a graph showing the reflectivity characteristics of a six-layered anti-reflection film according to the present invention, which is formed on a synthetic silica glass substrate and has a designed central wavelength ($\lambda 0$) of 248 nm.

Table 4 below summarizes the arrangement of the anti-reflection film for ultraviolet rays, which has a designed central wavelength (reference wavelength) λ0=248 nm. The anti-reflection film was fabricated using sputtering by stacking layers on a synthetic silica glass substrate to have film thicknesses shown in Table 4 below, and its reflection characteristics were measured. FIG. 6 shows the measurement results of the reflectivity optical characteristics. The wavelength bandwidth corresponding to a reflectivity of 0.2% or less was as broad as 33 nm.

TABLE 4

| Material | Optical Film Thickness (unit: nm) |
|---|---|
| Incidence Medium | Air | — |
| Sixth Layer | SiO$_2$ | 0.25λ0 |
| Fifth Layer | Al$_2$O$_3$ | 0.24λ0 |
| Fourth Layer | SiO$_2$ | 0.24λ0 |
| Third Layer | Al$_2$O$_3$ | 0.30λ0 |
| Second Layer | SiO$_2$ | 0.53λ0 |
| First Layer | Al$_2$O$_3$ | 0.12λ0 |
| Outgoing Medium | Synthetic silica | — |

Embodiment 5

Figure 7:
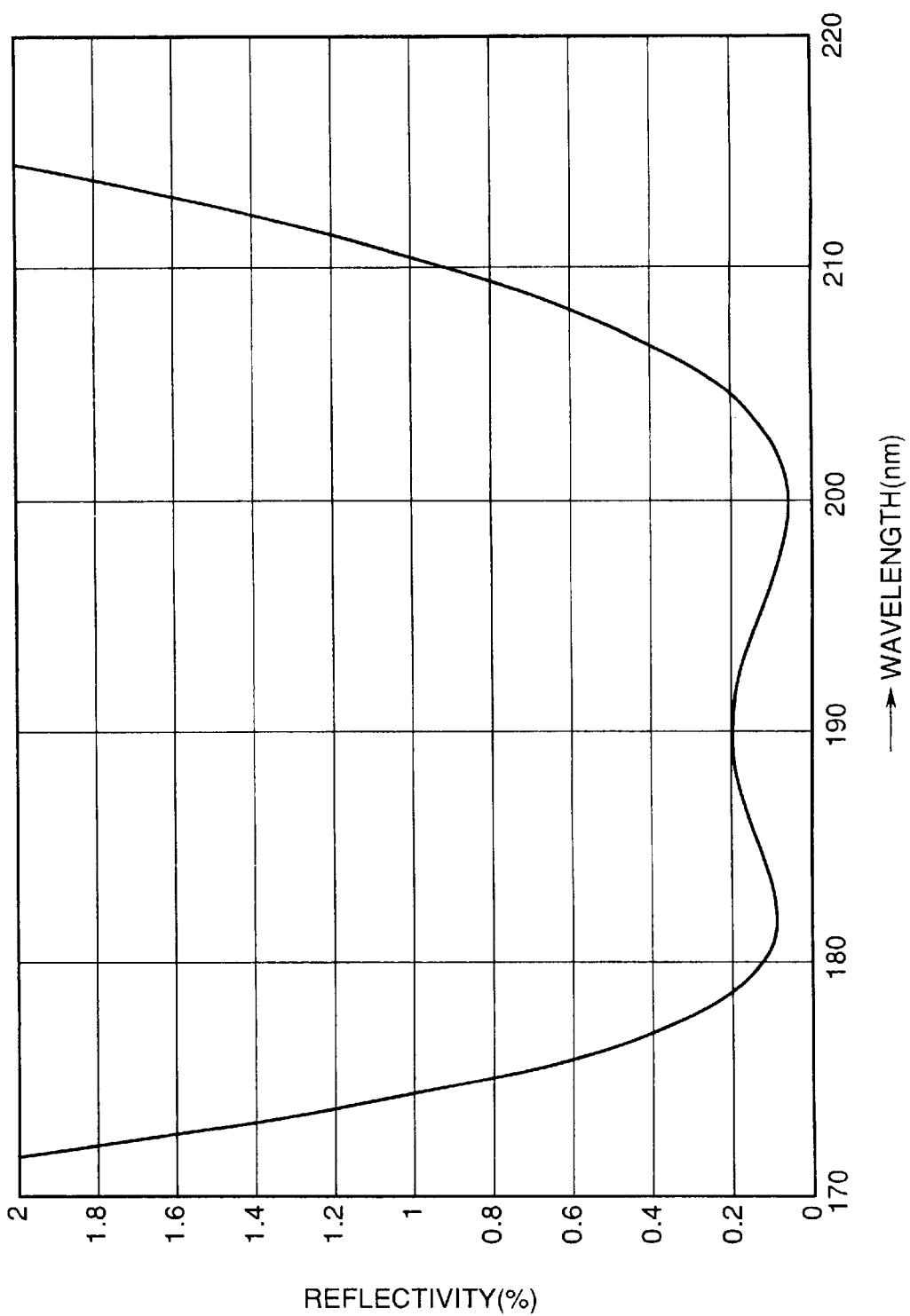
FIG. 7 is a graph showing the reflectivity characteristics of a six-layered anti-reflection film according to the present invention, which is formed on a fluorite substrate and has a designed central wavelength ($\lambda 0$) of 193 nm.

Table 5 below summarizes the arrangement of the anti-reflection film for ultraviolet rays, which has a designed central wavelength (reference wavelength) λ0=193 nm. The anti-reflection film was fabricated using sputtering by stacking layers on a fluorite substrate to have film thicknesses shown in Table 5 below, and its reflection characteristics were measured. FIG. 7 shows the measurement results of the reflectivity optical characteristics. The wavelength bandwidth corresponding to a reflectivity of 0.2% or less was as broad as 26 nm.

TABLE 5

| Material | Optical Film Thickness (unit: nm) |
|---|---|
| Incidence Medium | Air | — |
| Sixth Layer | SiO$_2$ | 0.25λ0 |
| Fifth Layer | Al$_2$O$_3$ | 0.24λ0 |
| Fourth Layer | SiO$_2$ | 0.24λ0 |
| Third Layer | Al$_2$O$_3$ | 0.28λ0 |
| Second Layer | SiO$_2$ | 0.55λ0 |

TABLE 5-continued

| | Material | Optical Film Thickness (unit: nm) |
|---|---|---|
| First Layer | Al$_2$O$_3$ | 0.12λ0 |
| Outgoing Medium | Fluorite (synthetic silica) | — |

Embodiment 6

Figure 8:
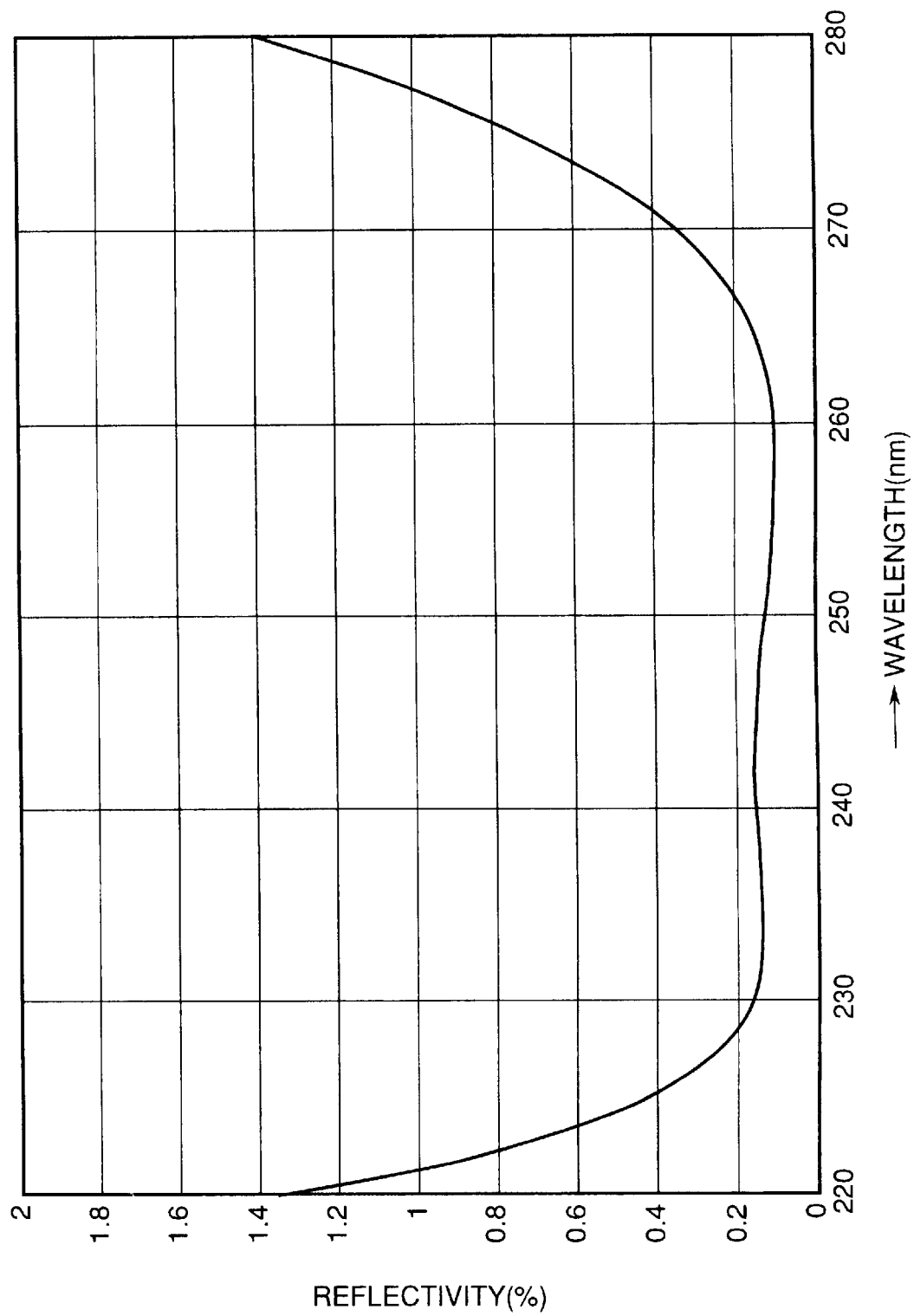
FIG. 8 is a graph showing the reflectivity characteristics of an eight-layered anti-reflection film according to the present invention, which is formed on a fluorite substrate and has a designed central wavelength ($\lambda 0$) of 248 nm.

Table 6 below summarizes the arrangement of the anti-reflection film for ultraviolet rays, which has a designed central wavelength (reference wavelength) λ0=248 nm. The anti-reflection film was fabricated using sputtering by stacking layers on a fluorite substrate to have film thicknesses shown in Table 6 below, and its reflection characteristics were measured. FIG. 8 shows the measurement results of the reflectivity optical characteristics. The wavelength bandwidth corresponding to a reflectivity of 0.2% or less was as broad as 39 nm.

TABLE 6

| | Material | Optical Film Thickness (unit: nm) |
|---|---|---|
| Incidence Medium | Air | — |
| Eighth Layer | SiO$_2$ | 0.25λ0 |
| Seventh Layer | Al$_2$O$_3$ | 0.24λ0 |
| Sixth Layer | SiO$_2$ | 0.27λ0 |
| Fifth Layer | Al$_2$O$_3$ | 0.20λ0 |
| Fourth Layer | SiO$_2$ | 0.52λ0 |
| Third Layer | Al$_2$O$_3$ | 0.26λ0 |
| Second Layer | SiO$_2$ | 0.61λ0 |
| First Layer | Al$_2$O$_3$ | 0.04λ0 |
| Outgoing Medium | Fluorite (synthetic silica) | — |

Embodiment 7

Figure 9:
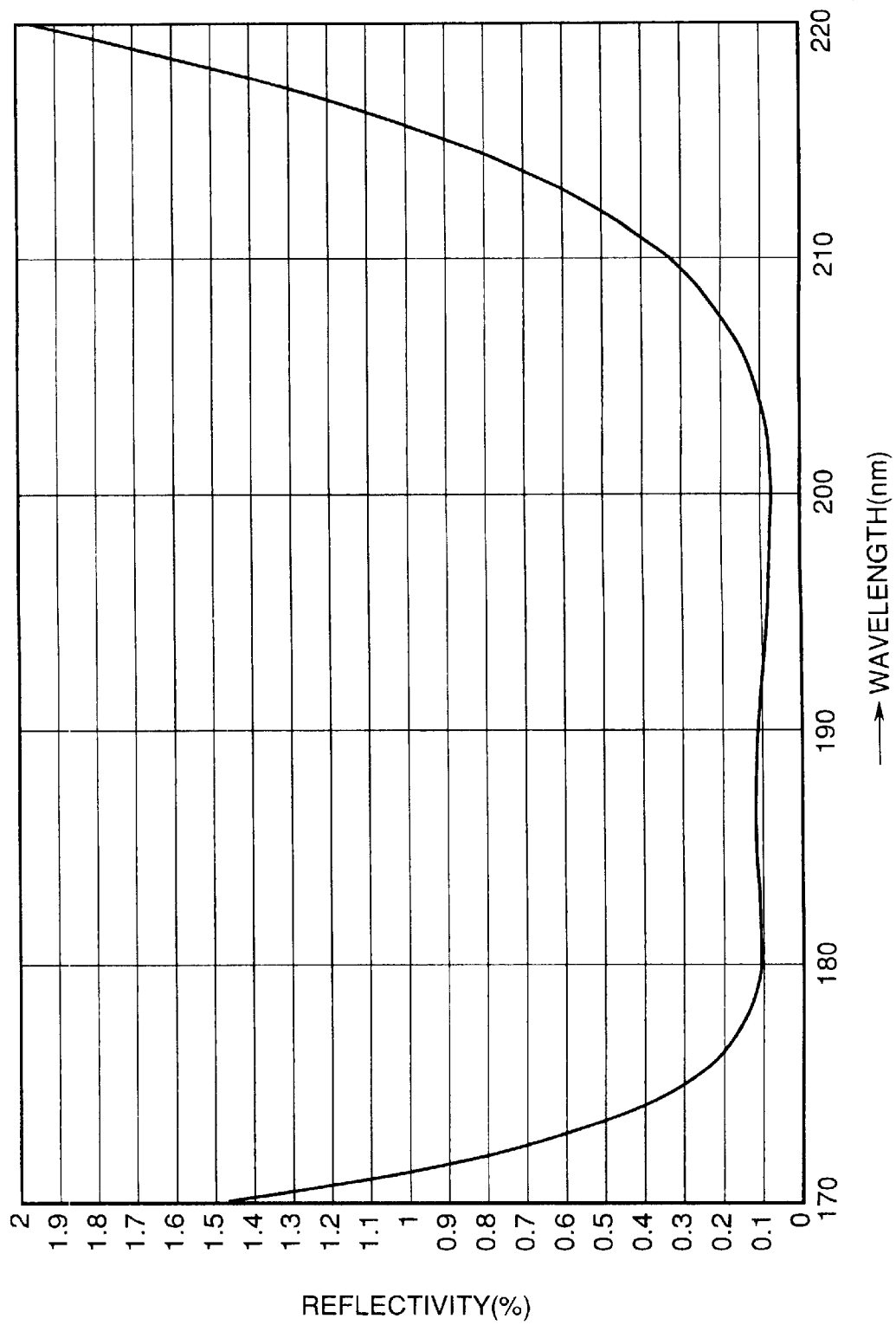
FIG. 9 is a graph showing the reflectivity characteristics of an eight-layered anti-reflection film according to the present invention, which is formed on a synthetic silica glass substrate and has a designed central wavelength ($\lambda 0$) of 193 nm.

Table 7 below summarizes the arrangement of the anti-reflection film for ultraviolet rays, which has a designed central wavelength (reference wavelength) λ0=193 nm. The anti-reflection film was fabricated using sputtering by stacking layers on a synthetic silica glass substrate to have film thicknesses shown in Table 7 below, and its reflection characteristics were measured. FIG. 9 shows the measurement results of the reflectivity optical characteristics. The wavelength bandwidth corresponding to a reflectivity of 0.2% or less was as broad as 34 nm.

TABLE 7

| | Material | Optical Film Thickness (unit: nm) |
|---|---|---|
| Incidence Medium | Air | — |
| Eighth Layer | SiO$_2$ | 0.25λ0 |
| Seventh Layer | Al$_2$O$_3$ | 0.24λ0 |
| Sixth Layer | SiO$_2$ | 0.27λ0 |
| Fifth Layer | Al$_2$O$_3$ | 0.20λ0 |
| Fourth Layer | SiO$_2$ | 0.52λ0 |
| Third Layer | Al$_2$O$_3$ | 0.26λ0 |
| Second Layer | SiO$_2$ | 0.61λ0 |
| First Layer | Al$_2$O$_3$ | 0.04λ0 |

TABLE 7-continued

| | Material | Optical Film Thickness (unit: nm) |
|---|---|---|
| Outgoing Medium | Synthetic silica glass substrate | — |

Embodiment 8

Figure 10:
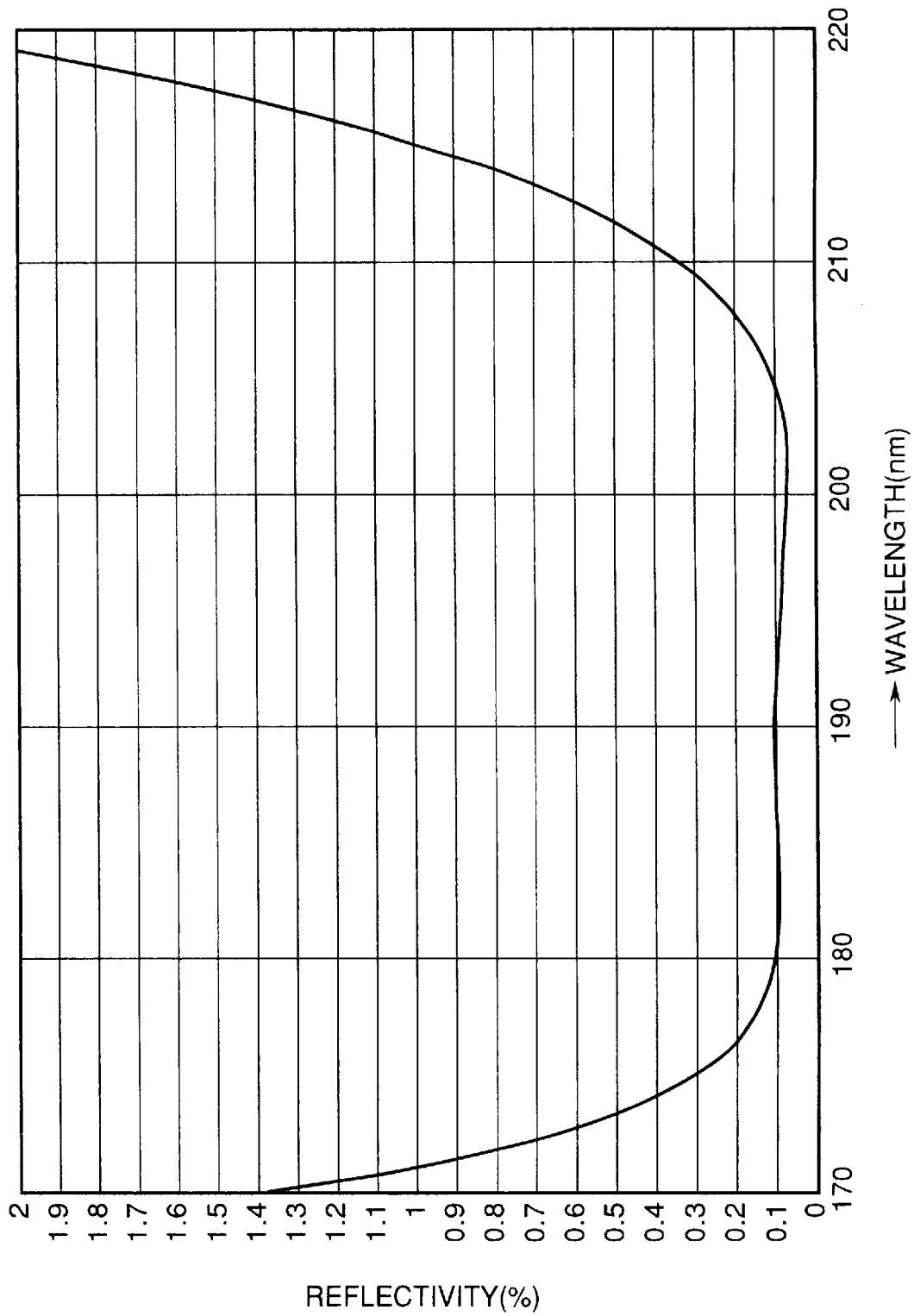
FIG. 10 is a graph showing the reflectivity characteristics of an eight-layered anti-reflection film according to the present invention, which is formed on a fluorite substrate and has a designed central wavelength ($\lambda 0$) of 193 nm.

Table 8 below summarizes the arrangement of the anti-reflection film for ultraviolet rays, which has a designed central wavelength (reference wavelength) λ0=193 nm. The anti-reflection film was fabricated using sputtering by stacking layers on a fluorite substrate to have film thicknesses shown in Table 8 below, and its reflection characteristics were measured. FIG. 10 shows the measurement results of the reflectivity optical characteristics. The wavelength bandwidth corresponding to a reflectivity of 0.2% or less was as broad as 33 nm.

TABLE 8

| | Material | Optical Film Thickness (unit: nm) |
|---|---|---|
| Incidence Medium | Air | — |
| Eighth Layer | SiO$_2$ | 0.24λ0 |
| Seventh Layer | Al$_2$O$_3$ | 0.25λ0 |
| Sixth Layer | SiO$_2$ | 0.27λ0 |
| Fifth Layer | Al$_2$O$_3$ | 0.20λ0 |
| Fourth Layer | SiO$_2$ | 0.51λ0 |
| Third Layer | Al$_2$O$_3$ | 0.26λ0 |
| Second Layer | SiO$_2$ | 0.62λ0 |
| First Layer | Al$_2$O$_3$ | 0.03λ0 |
| Outgoing Medium | Fluorite (synthetic silica) | — |

Figure 11:
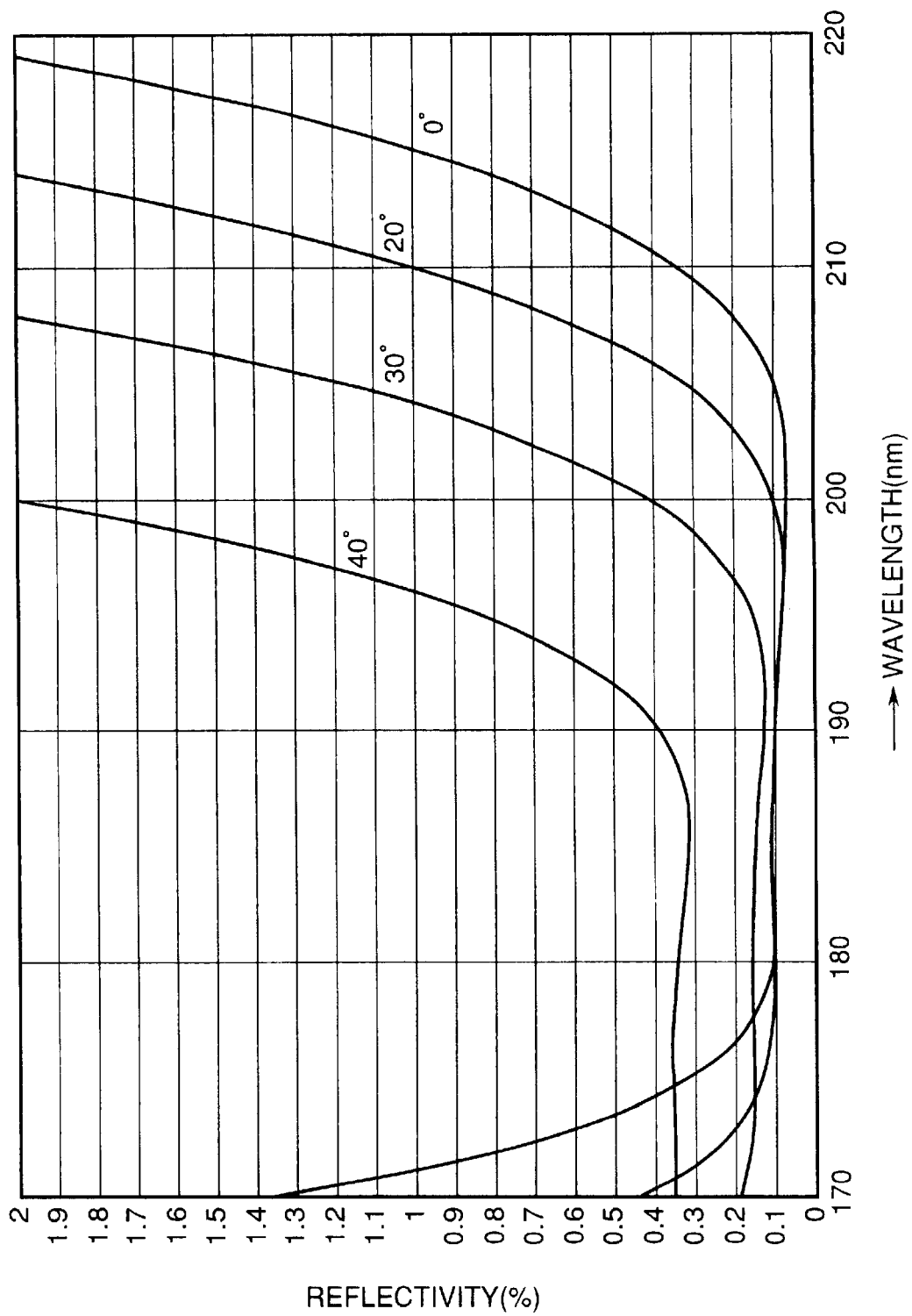
FIG. 11 is a graph showing the measurement results of dependence of the reflectivity characteristics on the angle of incidence of an eight-layered anti-reflection film according to the present invention, which is formed on a fluorite substrate and has a designed central wavelength ($\lambda 0$) of 193 nm.

FIG. 11 shows the measurement results obtained by changing the angle of incidence of light to this anti-reflection film from 0° to 40°. The reflectivity remained 0.2% or less even when the angle of incidence was changed from 0° to 30° at the designed central wavelength (λ0) of 193 nm.

In order to compare the environmental resistances between the anti-reflection films of Tables 1 to 8 above of this embodiment and anti-reflection films using fluoride films, and between fluoride single-layered films and SiO$_2$ and Al$_2$O$_3$ single-layered films, samples were left to stand in an environment having a temperature of 60° C. and a relative humidity of 90% for 1,000 hours, and their outer appearances and adhesive properties were compared. The fluoride film used NdF$_3$, LaF$_3$, GdF$_3$, HoF$_3$, and YbF$_3$ high-refractive index films and AlF$_3$, Na$_3$AlF$_6$, and MgF$_2$ low-refractive index films.

Upon leaving the samples in the environment of a temperature of 60° C. and a relative humidity of 90% for 1,000 hours, clouding and peeling were observed on the outer appearances of all the samples using fluorides including both the single-layered film samples and anti-reflection film samples, and all these samples were inferior to SiO$_2$ and Al$_2$O$_3$ in adhesive properties measured by tape tests.

In the present invention, an optical system in which the anti-reflection films with the above arrangement are applied to the lens surfaces, mirror surfaces, and the like is used in various types of apparatuses for the ultraviolet range. For example, an optical system using the anti-reflection film with the above arrangement is used in an illumination apparatus used for illuminating the reticle surface on which a circuit pattern is formed in fabricating semiconductor devices, an exposure apparatus for projecting a pattern on the reticle surface onto the wafer surface, and the like. The wafer obtained by the exposure apparatus is used in manufacturing devices via a development process.

Figure 12:
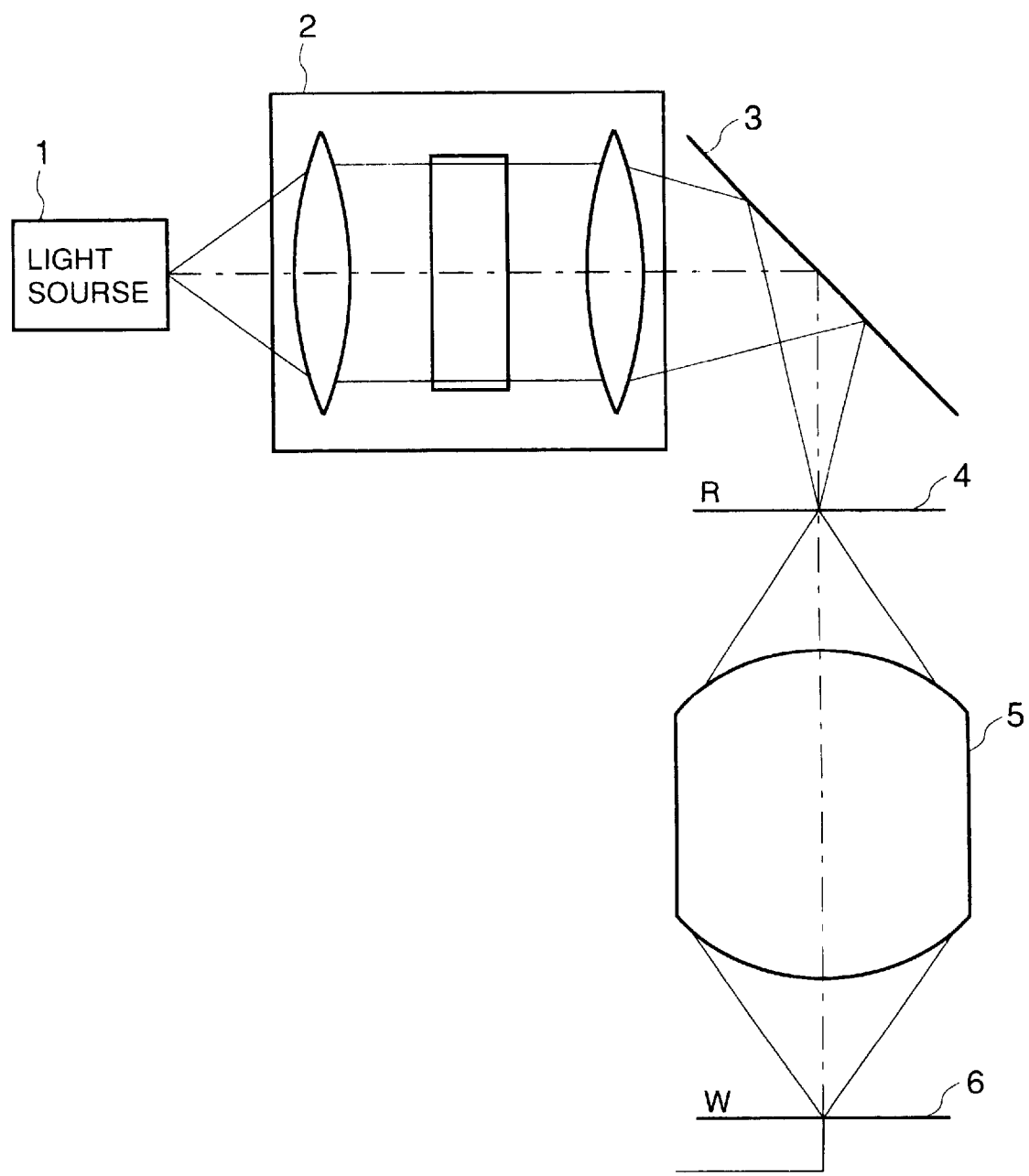
FIG. 12 is a schematic view showing principal part of an exposure apparatus according to the present invention.

FIG. 12 is a schematic view showing principal part of an exposure apparatus which uses an optical system comprising an anti-reflection film of the present invention and is used in the manufacture of semiconductor devices.

Referring to FIG. 12, a light source 1 such as an excimer laser outputs ultraviolet rays. An illumination unit 2 illuminates a reticle 4 with a light beam emitted by the light source 1. The light beam output from the illumination unit 2 is reflected by a mirror surface 3. A projection optical system 5 projects a pattern formed on the surface of the reticle 4 onto a wafer 6.

In this embodiment, the mirror 3, and optical elements such as lenses used in the illumination unit 2 and the projection optical system 5 are coated with the anti-reflection film of the present invention. With this optical system, a light beam can be prevented from being irregularly reflected by the respective surfaces, thereby preventing generation of flare and ghost and obtaining a satisfactory projection pattern.

An embodiment of the method of manufacturing a semiconductor device using the above-mentioned exposure apparatus will be described below.

Figure 13:
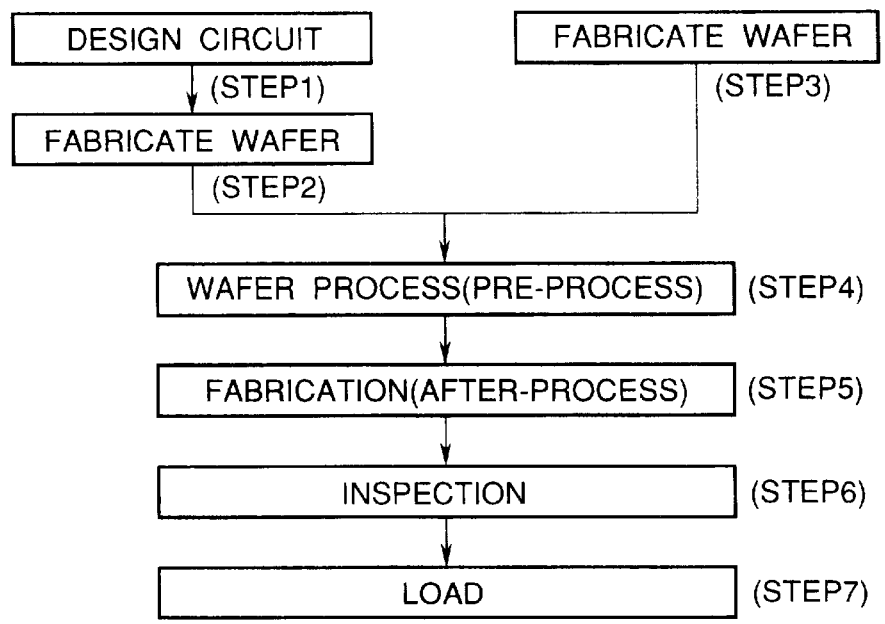
FIG. 13 is a flow chart showing the method of manufacturing a device of the present invention.

FIG. 13 is a flow chart showing the method of manufacturing semiconductor devices (semiconductor chips such as ICs, LSIs, and the like, liquid crystal panels, CCDs, and the like).

In this embodiment, in step 1 (design circuit), the circuit design of semiconductor devices is made. In step 2 (fabricate mask), a mask formed with the designed circuit pattern is fabricated.

On the other hand, in step 3 (fabricate wafer), a wafer is fabricated using a material such as silicon or the like. Step 4 (wafer process) is called a pre-process, and in this step, an actual circuit is formed on the wafer by lithography using the prepared mask and wafer.

The next step 5 (fabrication) is called an after-process (or post-process), in which a semiconductor chip is manufactured using the wafer fabricated in step 4, and includes an assembling process (dicing, bonding) and a packaging process (packaging the circuit into a chip).

In step 6 (inspection), inspections including the operation test, durability test, and the like of the semiconductor device fabricated in step 5 are made. The semiconductor device is completed via these steps, and is loaded (step 7).

Figure 14:
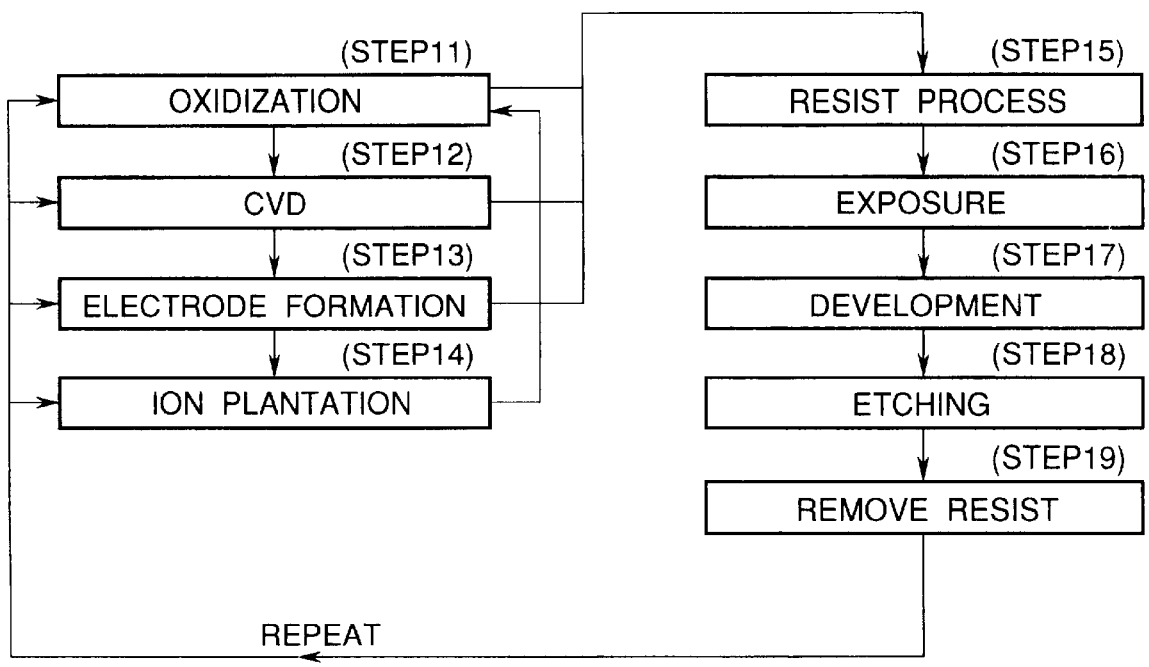
FIG. 14 is a flow chart showing the method of manufacturing a device of the present invention.

FIG. 14 is a flow chart showing in detail the wafer process in step 4 above. In step 11 (oxidization), the surface of the wafer is oxidized. In step 12 (CVD), an insulating film is formed on the wafer surface.

In step 13 (electrode formation), electrodes are formed on the wafer by deposition. In step 14 (ion implantation), ions are implanted into the wafer. In step 15 (resist process), the wafer is coated with a photosensitive agent. In step 16 (exposure), the circuit pattern on the mask is printed on the wafer by exposure using the above-mentioned exposure apparatus.

In step 17 (development), the exposed wafer is developed. In step 18 (etching), portions other than the developed resist portions are removed. In step 1 (remove resist), the developed resist portions which have become unnecessary after the etching are removed. By repeating these steps, circuit patterns are repetitively formed on the wafer.

Note that a highly integrated semiconductor device can be easily manufactured using the manufacturing method of this embodiment.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An anti-reflection film arranged by alternately stacking a plurality of high-refractive index layers containing $Al_2O_3$ and a plurality of low-refractive index layers containing $SiO_2$ on a transparent substrate in turn from the substrate side to an air side, and satisfying:

$1.45 \leq ns \leq 1.65$ $1.60 \leq na \leq 1.85$ $0.31\lambda0 \leq d1 \leq 0.42\lambda0$ $0.38\lambda0 \leq d2 \leq 0.45\lambda0$ $0.20\lambda0 \leq d3 \leq 0.31\lambda0$ $0.18\lambda0 \leq d4 \leq 0.28\lambda0$ $0.20\lambda0 \leq d5 \leq 0.30\lambda0$ $0.20\lambda0 \leq d6 \leq 0.30\lambda0$ where ns and na are the refractive indices of the low-refractive index layer and the high-refractive index layer for light components falling with a wavelength range from 190 nm to 250 nm, di (unit: nm) is the optical film thickness of the i-th layer when the high- and low-refractive index layers are counted from the substrate side to the air side, and $\lambda0$ (nm) is the reference wavelength within the wavelength range from 190 nm to 250 nm.

2. An anti-reflection film according to claim 1, wherein said substrate comprises fluorite.

3. An anti-reflection film according to claim 1, wherein said anti-reflection film is formed by sputtering.

4. An anti-reflection film according to claim 1, wherein said anti-reflection film is formed by vacuum deposition.

5. An optical system comprising:

a lens, which is coated with an anti-reflection film arranged by alternately stacking a plurality of high-refractive index layers containing $Al_2O_3$ and a plurality of low-refractive index layers containing $SiO_2$ on a transparent substrate in turn from the substrate side to an air side, and satisfying:

$1.45 \leq ns \leq 1.65$ $1.60 \leq na \leq 1.85$ $0.31\lambda0 \leq d1 \leq 0.42\lambda0$ $0.38\lambda0 \leq d2 \leq 0.45\lambda0$ $0.20\lambda0 \leq d3 \leq 0.31\lambda0$ $0.18\lambda0 \leq d4 \leq 0.28\lambda0$ $0.20\lambda0 \leq d5 \leq 0.30\lambda0$ $0.20\lambda0 \leq d6 \leq 0.30\lambda0$ where ns and na are the refractive indices of the low-refractive index layer and the high-refractive index layer for light components falling with a wavelength range from 190 nm to 250 nm, di (unit: nm) is the optical film thickness of the i-th layer when the high- and low-refractive index layers are counted from the substrate side to the air side, and $\lambda0$ (nm) is the reference wavelength within the wavelength range from 190 nm to 250 nm.

6. An anti-reflection film arranged by alternately stacking a plurality of high-refractive index layers containing $Al_2O_3$ and a plurality of low-refractive index layers containing $SiO_2$ on a transparent substrate in turn from the substrate side to an air side, and satisfying:

$1.45 \leq ns \leq 1.65$
$1.60 \leq na \leq 1.85$
$0.06\lambda 0 \leq d1 \leq 0.17\lambda 0$
$0.48\lambda 0 \leq d2 \leq 0.59\lambda 0$
$0.25\lambda 0 \leq d3 \leq 0.35\lambda 0$
$0.18\lambda 0 \leq d4 \leq 0.28\lambda 0$
$0.20\lambda 0 \leq d5 \leq 0.30\lambda 0$
$0.20\lambda 0 \leq d6 \leq 0.30\lambda 0$ where ns and na are the refractive indices of the low-refractive index layer and the high-refractive index layer for light components falling with a wavelength range from 190 nm to 250 nm, di (unit: nm) is the optical film thickness of the i-th layer when the high- and low-refractive index layers are counted from the substrate side to the air side, and $\lambda 0$ (nm) is the reference wavelength within the wavelength range from 190 nm to 250 nm.

7. An anti-reflection film according to claim 6, wherein said substrate comprises fluorite.

8. An anti-reflection film according to claim 6, wherein said anti-reflection film is formed by sputtering.

9. An anti-reflection film according to claim 6, wherein said anti-reflection film is formed by vacuum deposition.

10. An optical system comprising:

a lens, which is coated with an anti-reflection film arranged by alternately stacking a plurality of high-refractive index layers containing $Al_2O_3$ and a plurality of low-refractive index layers containing $SiO_2$ on a transparent substrate in turn from the substrate side to an air side, and satisfying:

$1.45 \leq ns \leq 1.65$
$1.60 \leq na \leq 1.85$
$0.06\lambda 0 \leq d1 \leq 0.17\lambda 0$
$0.48\lambda 0 \leq d2 \leq 0.59\lambda 0$
$0.25\lambda 0 \leq d3 \leq 0.35\lambda 0$
$0.18\lambda 0 \leq d4 \leq 0.28\lambda 0$
$0.20\lambda 0 \leq d5 \leq 0.30\lambda 0$
$0.20\lambda 0 \leq d6 \leq 0.30\lambda 0$ where ns and na are the refractive indices of the low-refractive index layer and the high-refractive index layer for light components falling with a wavelength range from 190 nm to 250 nm, di (unit: nm) is the optical film thickness of the i-th layer when the high- and low-refractive index layers are counted from the substrate side to the air side, and $\lambda 0$ (nm) is the reference wavelength within the wavelength range from 190 nm to 250 nm.

11. An anti-reflection film arranged by alternately stacking a plurality of high-refractive index layers containing $Al_2O_3$ and a plurality of low-refractive index layers containing $SiO_2$ on a transparent substrate in turn from the substrate side to an air side, and satisfying:

$1.45 \leq ns \leq 1.65$
$1.60 \leq na \leq 1.85$
$0.01\lambda 0 \leq d1 \leq 0.11\lambda 0$
$0.57\lambda 0 \leq d2 \leq 0.67\lambda 0$
$0.20\lambda 0 \leq d3 \leq 0.31\lambda 0$
$0.45\lambda 0 \leq d4 \leq 0.56\lambda 0$
$0.15\lambda 0 \leq d5 \leq 0.26\lambda 0$
$0.21\lambda 0 \leq d6 \leq 0.32\lambda 0$
$0.20\lambda 0 \leq d7 \leq 0.30\lambda 0$
$0.20\lambda 0 \leq d8 \leq 0.30\lambda 0$ where ns and na are the refractive indices of the low-refractive index layer and the high-refractive index layer for light components falling with a wavelength range from 190 nm to 250 nm, di (unit: nm) is the optical film thickness of the i-th layer when the high- and low-refractive index layers are counted from the substrate side to the air side, and $\lambda 0$ (nm) is the reference wavelength within the wavelength range from 190 nm to 250 nm.

12. An anti-reflection film according to claim 11, wherein said substrate comprises fluorite.

13. An anti-reflection film according to claim 11, wherein said anti-reflection film is formed by sputtering.

14. An anti-reflection film according to claim 11, wherein said anti-reflection film is formed by vacuum deposition.

15. An optical system comprising:

a lens, which is coated with an anti-reflection film arranged by alternately stacking a plurality of high-refractive index layers containing $Al_2O_3$ and a plurality of low-refractive index layers containing $SiO_2$ on a transparent substrate in turn from the substrate side to an air side, and satisfying:

$1.45 \leq ns \leq 1.65$
$1.60 \leq na \leq 1.85$
$0.01\lambda 0 \leq d1 \leq 0.11\lambda 0$
$0.57\lambda 0 \leq d2 \leq 0.67\lambda 0$
$0.20\lambda 0 \leq d3 \leq 0.31\lambda 0$
$0.45\lambda 0 \leq d4 \leq 0.56\lambda 0$
$0.15\lambda 0 \leq d5 \leq 0.26\lambda 0$
$0.21\lambda 0 \leq d6 \leq 0.32\lambda 0$
$0.20\lambda 0 \leq d7 \leq 0.30\lambda 0$
$0.20\lambda 0 \leq d8 \leq 0.30\lambda 0$ where ns and na are the refractive indices of the low-refractive index layer and the high-refractive index layer for light components falling with a wavelength range from 190 nm to 250 nm, di (unit: nm) is the optical film thickness of the i-th layer when the high- and low-refractive index layers are counted from the substrate side to the air side, and $\lambda 0$ (nm) is the reference wavelength within the wavelength range from 190 nm to 250 nm.

* * * * *